United States Patent [19]

Adkins et al.

[11] Patent Number: 5,779,414

[45] Date of Patent: Jul. 14, 1998

[54] SCREW THREADED FASTENERS

[75] Inventors: David Paul Adkins, Chapelfields;, Mark Ford, Bulkington, both of Great Britain

[73] Assignee: Jaguar Cars Limited, Coventry, Great Britain

[21] Appl. No.: 584,231

[22] Filed: Jan. 11, 1996

[30] Foreign Application Priority Data

Jan. 12, 1995 [GB] United Kingdom ............... 9500623

[51] Int. Cl.⁶ .................................................. B60T 8/32
[52] U.S. Cl. ..................... 411/317; 411/348; 411/513; 411/530; 411/945
[58] Field of Search ........................... 411/317, 348, 411/513, 514, 516, 530, 945, 946, 395, 405, 410; 301/124.1, 131

[56] References Cited

U.S. PATENT DOCUMENTS

| | | | |
|---|---|---|---|
| 673,056 | 4/1901 | Jacobs | 411/405 |
| 759,898 | 5/1904 | Louman | 411/945 |
| 763,821 | 6/1904 | Wesson | 411/945 |
| 874,544 | 12/1907 | Schmidt | 411/946 |
| 996,540 | 6/1911 | Thomshaw | 411/945 |
| 1,302,854 | 5/1919 | Redmer | 411/405 |
| 1,367,336 | 2/1921 | Ward | |
| 1,740,094 | 12/1929 | Huff | 411/946 |
| 2,395,234 | 2/1946 | Schlueter | |
| 3,457,573 | 7/1969 | Patyna | 411/395 |
| 4,917,003 | 4/1990 | Kollross | |
| 4,969,694 | 11/1990 | Caron | |

FOREIGN PATENT DOCUMENTS

| | | |
|---|---|---|
| 0529252 | 8/1995 | European Pat. Off. |
| 620583 | 1/1927 | France |
| 1309948 | 10/1962 | France |
| 4128508C1 | 10/1992 | Germany |
| 162070 | 4/1921 | United Kingdom |
| 846822 | 8/1960 | United Kingdom |
| 2180028 | 3/1987 | United Kingdom |
| 2235268 | 2/1991 | United Kingdom |

*Primary Examiner*—Brian K. Green
*Assistant Examiner*—Fredrick Conley
*Attorney, Agent, or Firm*—James J. Dottavio

[57] ABSTRACT

A screw threaded fastener comprising a first member with an external screw thread and a second member with a corresponding internal screw thread. One of said first and second members has a radial bore, and the other of said first and second members has a corresponding recess, so that when the screw threads of the first and second members engage, the radial bore may be aligned angularly with the recess. A resilient pin assembly is provided having pins located in said radial bore. The pins are thus resiliently urged in said radial bore toward said recess, so that when the radial bore is aligned angularly with the recess, the pins engage the recess, preventing further relative rotation between the first and second members.

5 Claims, 3 Drawing Sheets

5,779,414

1
SCREW THREADED FASTENERS

BACKGROUND OF THE INVENTION

1. Field of the Invention

The present invention relates to screw threaded fasteners and in particular to locking means for screw threaded fasteners.

2. Description of the Prior Art

In a conventional locking arrangement for screw threaded fasteners, a series of castellations are provided on a radial face of an internally threaded member and a pin is located through a diametrical bore in an externally threaded member to engage the castellations and thus prevent relative rotation of the internal and external threaded members.

This form of locking arrangement may be utilized where the tool used to tighten the fastener, for example a spanner, provides open access to the end of the threaded fastener and the end of the threaded fastener is easily accessible, so that alignment of the diametrical bore with a gap between castellations can be observed and the pin may be introduced into the diametrical bore to lock the fastener.

However, if a closed tool, for example a socket, is used to tighten the fastener, the fastener must first be tightened to the required torque. The operator cannot see the diametrical bore to align it with a gap between castellations. The operator must therefore further tighten the fastener incrementally, removing the tool each time to see if the bore is aligned with a gap, so that the pin can be inserted. Furthermore, if the end of the fastener is inaccessible radially so that the pin cannot be inserted into the bore, this form of locking arrangement cannot be used.

SUMMARY OF THE INVENTION

It is an object of the present invention to provide a locking means which eliminates the problem associated with prior art designs requiring an open tool to view the nut for alignment of the diametrical bore with the gap between castellations for insertion of a pin to lock the fastener. A further object is to provide a locking means which can be used where the end of the fastener is inaccessible radially.

In realizing these objectives, a fastener according to the present invention comprises a first member having an external screw thread, and a second member having a corresponding internal screw thread. One of said first and second members has a radial bore, and the other of said first and second members has a corresponding recess means, so that when the screw threads of the first and second members engage, the radial bore may be aligned angularly with the recess means. A pin assembly is provided which comprises a pin mounted on resilient means, the pin being located in said radial bore and being urged by the resilient means towards said recess means, so that when the radial bore is aligned angularly with the recess means, the pin will spring into the recess means, preventing further relative rotation between the first and second members.

DESCRIPTION OF THE PREFERRED EMBODIMENTS

Figure 1:
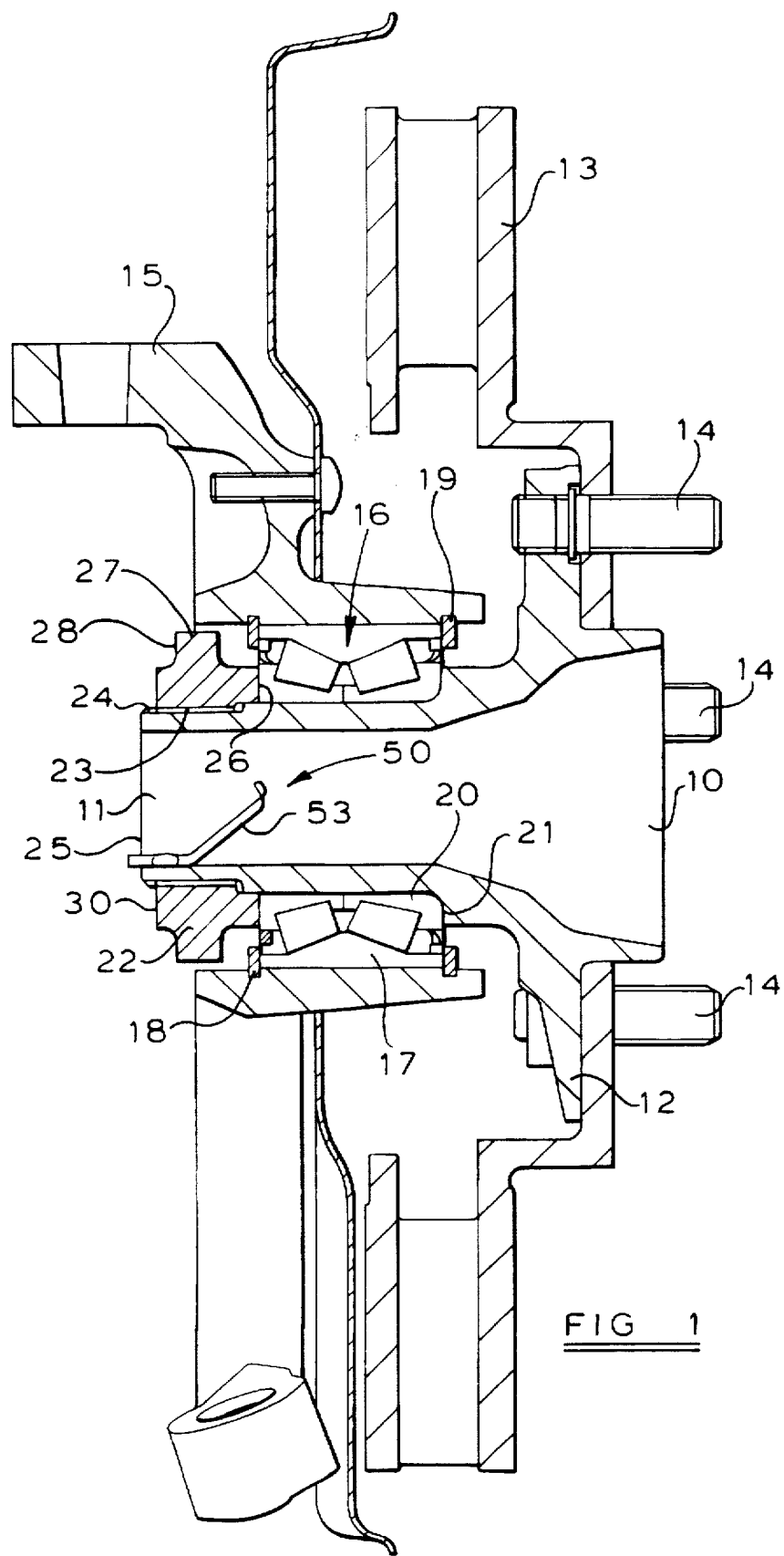
FIG. 1 is a cross-sectional elevation of a motor vehicle wheel hub assembly with a combined nut and antilock brake sensing ring locked to the inner end of the hub in accordance with the present invention.
Figure 2:
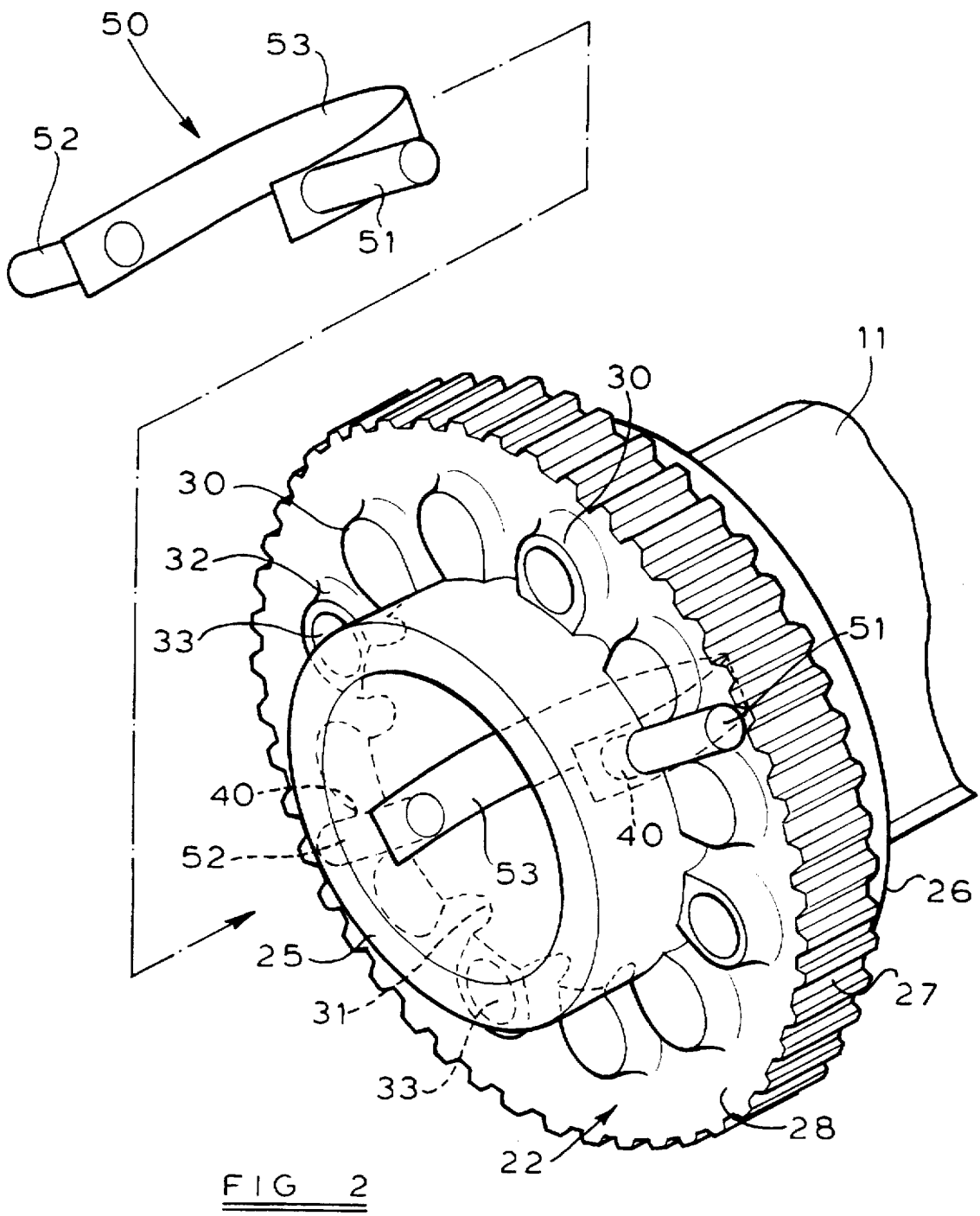
FIG. 2 it an isometric view of the inner end of the hub assembly illustrated in FIG. 1.

As illustrated in FIGS. 1 and 2, a first threaded member, comprising a hub 10 for a motor vehicle is provided. The hub 10 comprises a tubular portion 11 with outwardly extending flange 12 to which the brake disc 13 and wheel of the vehicle may be secured by means of a plurality of studs 14 in conventional manner. The flange 12 is provided at the outer end of the tubular portion 11.

The hub 10, is rotatably mounted in a suspension member 15 by means of a bearing assembly 16. The outer race 17 of the bearing 16 is located axially with respect to the suspension member 15 between a pair of circlips 18 and 19. The inner race 20 of the bearing 16 is located on the tubular portion 11 of the hub 10, between a radial face 21 adjacent to the flange 12 and a second threaded member, comprising an antilock braking system sensor ring 22.

The antilock sensor ring 22 has an internal screw thread 23 which threadably engages a corresponding screw thread 24 on the external diameter of the tubular portion 11 of hub 10. The screw thread 24 is at the end 25 of the tubular portion 11 remote from the flange 12. The outer end 26 of the sensor ring 22 forms an annular abutment which may be tightened against the inner end of the inner race 20 of bearing 16, to clamp the inner race 20 against the radial face 21 of the hub 10. The inner portion of the sensor ring 22 defines a series of angular spaced teeth 27, movement of which may be sensed by a suitable inductive pickup (not shown) to monitor the speed of rotation of the hub 10.

An aperture means is provided between the first and second threaded members, comprising a radial bore in one of the first and second members and a recess means in the other of the first and second members, comprising an aperture or recess. The aperture means is engaged by a pin assembly 50 to lock the first and second members against rotation.

In the preferred embodiment, the hub 10 has the radial bore and the sensor ring 22 is provided with recesses for the locking means. The inner end face 28 of the sensor ring 22 is provided with a series of angularly spaced axially extending castellations 30. As shown in FIG. 2, the bases 31 of the gaps 32 between castellations are radiussed. Axially extending apertures 33 are provided in four of the castellations 30. The apertures 33 are regularly spaced angularly.

A transverse bore 40 is provided radially through the tubular portion 11 of hub 10 adjacent the inner end 25 thereof. The bore 40 penetrates the wall of the tubular portion 11 at diametrically opposed locations. The bore 40 is located such that when sensor ring 22 is tightened against the inner race 20 of bearing 16 to the required torque, the bore 40 is located axially between the inner face 28 of sensor ring 22 and the end faces of the castellations 30, the diameter of the bore 40 being less than the width of the gaps 32 between successive castellations 30.

A pin assembly 50 comprises a pair of pins 51 and 52 which are secured to opposite ends of a resilient means, preferably a "U" shaped spring element 53. An equivalent shape, such as a "V" shaped spring or other shapes which urge the pins in a manner similar to the "U" shaped spring are substantially a "U" shaped spring for the purposes of this invention. In the preferred embodiment, the pins 51, 52 extend coaxially from one another, radially from the open end of the "U" of the spring element 53. The spring element 53 is dimensioned to fit within the bore of the tubular portion 11 of hub 10, transversely thereof. The spring 53 is compressible to permit the pins 51, 52 to pass inside the bore of the tubular portion 11, so that each pin 51, 52 may be located in the adjacent portion of the diametrical bore 40 through the wall of the tubular portion 11. The spring element 53 biases the pins 51 and 52 outwardly, so that they extend through the wall and beyond the external diameter of the tubular portion 11.

Accordingly, the pin assembly 50 can be inserted into the radial bore 40 from within the axial bore of the tubular section 11. This locking assembly therefore only requires axial access to the fastener and may consequently be used where radial access is not readily available. The hub 10 may be of solid construction, wherein the tubular section 11 comprises a closed axial bore (not shown) which extends only for a sufficient length in the tubular section 11 to permit the pin assembly 50 to be located so that the pin 51, 52 engages in the transverse bore 40. Alternatively, the hub 10 may have open ends as shown in the preferred embodiment.

To assemble the hub 10, the bearing 16 is pressed into the suspension member 15, located axially by circlips 18,19. The tubular portion 11 of the hub 10 is then located through the bearing 16 until the radial face 21 abuts the outer end of the inner race 20. The sensor ring 22 is then secured to the inner end of tubular portion 11 and is tightened to the required torque against the inner end of inner race 20, using a tool in the form of a cup with axially extending pins which engage in the axially extending apertures 33.

Once the ring 22 has been tightened to the required torque, the tool is removed and the spring assembly is compressed so that it may be introduced into the bore of the tubular portion 11 of hub 10, transverse thereto. The pins 51 and 52 are then located in opposite portions of the bore 40 from within the tubular portion 11, so that upon release of the spring element 53, the pins are urged outwardly into the bore 40. If the bore 40 is aligned with gaps 32 between castellations 30, the pins 51 and 52 extend through the aperture 40 and out between the castellations 30 to lock the ring 22 with respect to the hub 10. If, on the other hand, the bore 40 is not aligned with gaps 32, the castellations 30 prevent the pins 51 and 52 from emerging outwardly from the bore 40. In such circumstances, the tool may be reengaged with the ring 22 and the ring 22 tightened further until gaps 32 are aligned with the bore 40 and the pins 51, 52 spring out under the load applied by spring element 53, the pins thus locking the ring 22.

To remove the ring 22, the spring 53 may be compressed to retract the pins 51 and 52, so the pin assembly 50 may be removed from the tubular member 11. The ring 22 may then be unscrewed from the tubular portion 11 of hub 10.

Figure 3:
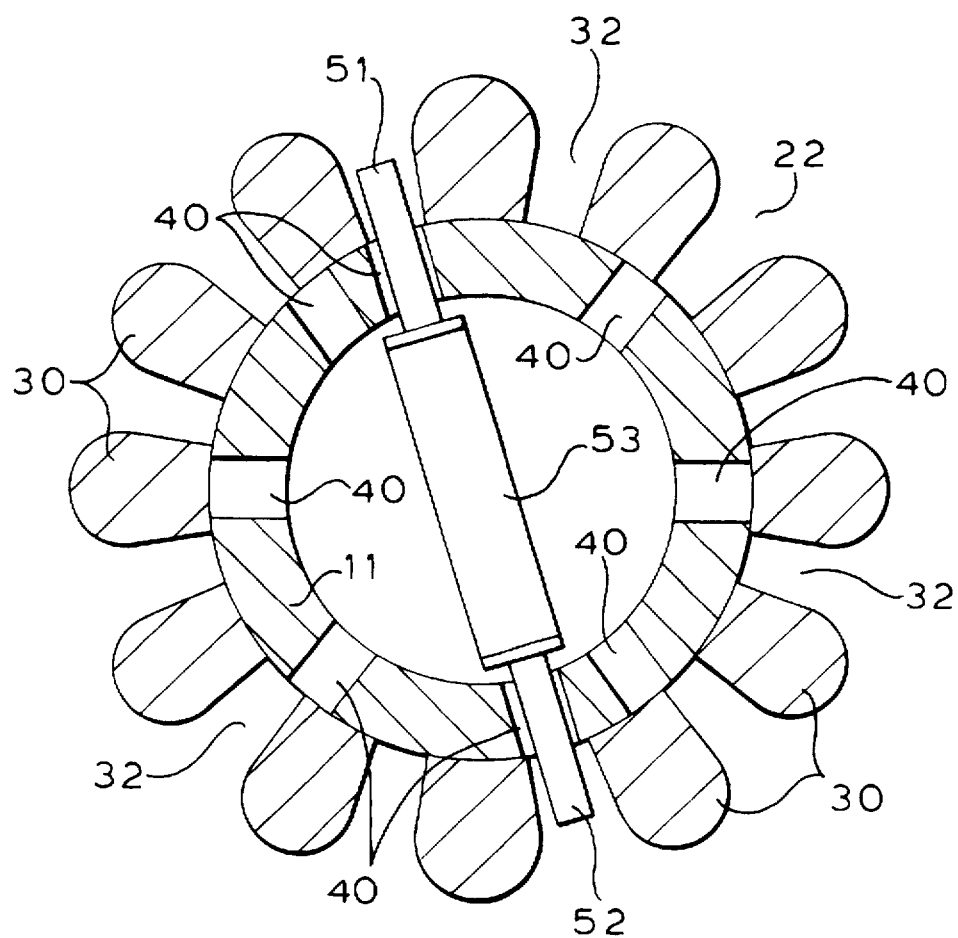
FIG. 3 is a sectional end elevation illustrating a modification to the assembly illustrated in FIG. 1.

In this embodiment, the degree to which the ring 22 is overtightened to bring the bore 40 into alignment with a gap 32 between castellations 30 depends on the spacing between the castellations 30. In order to reduce the amount of overtightening required, a plurality of diametric bores 40 may be provided through the tubular portion 11 of the hub 10 as illustrated in FIG. 3. The bores 40 are spaced angularly about the hub 10 at different angular separations to the castellations 30 so that the angular misalignment between the bores 40 and the nearest gaps 32 will vary. Once the ring 22 has been tightened to the required torque, the pin assembly 50 may then be located in the bore 40 which is nearest to alignment with a gap 32, thereby minimizing the overtightening required to lock the ring 22.

In the embodiment illustrated in FIG. 3, the ring 22 has twelve castellations which are spaced evenly around the ring 22 at 30° intervals. The spacing of the bores varies, in this embodiment, the bores 40 in the hub 10 are located at 0°; 52.5°; 105° and 128°.

Alternatively, the sensor ring 22 could be secured to the hub 10 using a closed tool, instead of the tool described above in the form of a cup with axially extending pins which engage in the axially extending apertures 33. The closed tool would be used to secure the nut to the desired torque. The tool may then be removed and the pins 51, 52 of the pin assembly inserted into the radial bore 40 so the pins are biased into engagement with the ring 22. The closed tool may then be reapplied to the ring 22 and the ring 22 tightened further until the radial bore 40 aligns with the aperture or recess 32, the pins 51, 52 then spring into the aperture or recess 32 to lock the ring 22 with respect to the hub 10.

To undo the fastener, the spring assembly 50 is merely deformed so that the pins 51, 52 are moved radially clear of the radial bore 40 and the pin assembly 50 is removed.

Various other modifications may be made without departing from the invention. For example, while in the above embodiment the transverse bore 40 extends diametrically and a pair of pins 51, 52 are arranged to engage castellations 30 on either side of the fastener, a pin assembly with a single pin or with more than two pins and a corresponding number of radial bores, may alternatively be used (not shown).

While in the above embodiment the pin assembly 50 is formed from pins 51, 52 which are formed separately and are secured to the spring element 53 in suitable manner. In an alternative embodiment (not shown) the pin or pins may be formed integrally of the resilient means, for example the resilient means may be formed from a coiled wire, the ends of the wire forming the pins.

In the above embodiment radial bores 40 are provided in the hub 10 for alignment with gaps 32 between castellations 30 in the ring 22. Although not shown, the bores may alternatively be provided in the ring 22, and axially extending apertures or recesses provided in the hub 10.

Although the preferred embodiments of the present invention have been disclosed, various changes and modifications may be made without departing from the scope of the invention as set forth in the appended claims.

We claim:

1. A wheel hub assembly for a motor vehicle comprising:

a spindle having an external screw thread, an axial bore and a radial hole therein;

a ring having an internal thread corresponding to said external screw thread and opposite outer faces, one of said faces having a plurality of axial projections extending therefrom forming an aperture between said projections in registration with the radial bore of said spindle; and a pin assembly having a radially projecting pin and a spring, said spring urging said pin radially outwardly through said radial hole into said aperture to hold said ring against rotation relative to said spindle.

2. A wheel hub assembly according to claim 1, wherein said pin assembly is U-shaped.

3. A wheel hub assembly according to claim 1, wherein said ring has a radial surface having a plurality of circumferentially spaced axial apertures therein for engagement by a tool for rotation of the ring relative to the hub.

4. A wheel hub assembly according to claim 1, wherein said ring has a radial surface having a plurality of circumferentially spaced axial projections thereon for engagement by a tool for rotation of the ring relative to the hub.

5. A wheel hub assembly according to claim 1, wherein said ring has an annular surface having a plurality of ABS sensor teeth thereon.

* * * * *